United States Patent [19]

Schmid et al.

[11] Patent Number: 5,210,773
[45] Date of Patent: May 11, 1993

[54] PROCESS FOR THE INTERMEDIATE AMPLIFICATION OF DIGITAL SIGNALS AND INTERMEDIATE AMPLIFIERS FOR DIGITAL SIGNALS

[75] Inventors: Bernhard Schmid, Stuttgart; Rainer Schenkyr, Reichenbach, both of Fed. Rep. of Germany

[73] Assignee: Richard Hirschmann GmbH & Co., Fed. Rep. of Germany

[21] Appl. No.: 570,924

[22] Filed: Aug. 22, 1990

[30] Foreign Application Priority Data

Aug. 22, 1989 [DE] Fed. Rep. of Germany ....... 3927681

[51] Int. Cl.⁵ .......................................... H04L 25/52
[52] U.S. Cl. .................................. 375/4; 375/118; 328/164
[58] Field of Search ................. 375/4, 118, 110, 111, 375/112, 3; 370/102, 75.97, 105, 85.15; 455/18; 341/70; 328/164; 331/17

[56] References Cited

U.S. PATENT DOCUMENTS 4,347,620 8/1982 Black et al. .................... 375/112
5,052,022 9/1991 Nishita et al. ..................... 375/4

*Primary Examiner*—Curtis Kuntz
*Assistant Examiner*—Tesfaldet Bocure
*Attorney, Agent, or Firm*—Robert J. Koch

[57] ABSTRACT

An intermediate amplification process for digital signals with pulse regeneration, determines the phase difference between the receiving timing signal and the local transmission timing signal and alters the phase of the local transmission timing signal as a function of the phase difference. It is particularly advantageous that the receiving timing signal is used as the transmission timing signal as soon as the phase difference becomes essentially zero. It is possible in this manner to minimize both the startup time delay and the packet spacing, as the number of bits to be stored intermediately may be kept low.

28 Claims, 6 Drawing Sheets

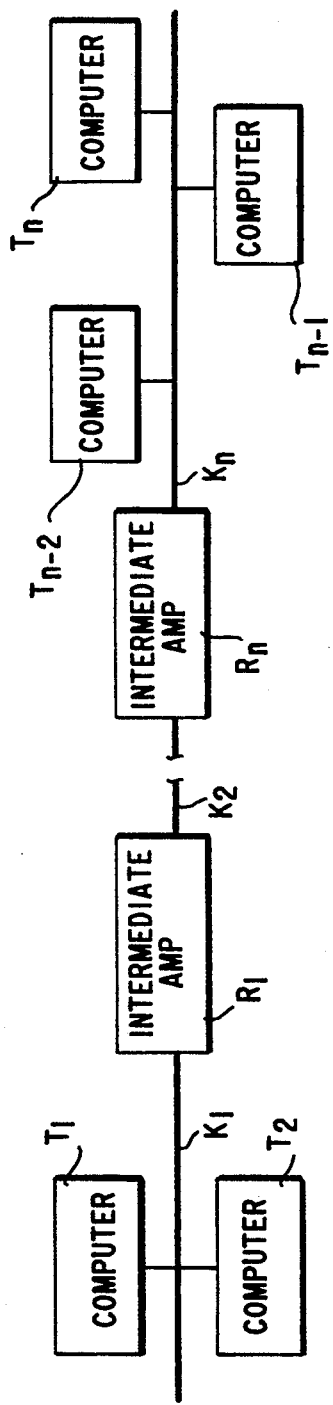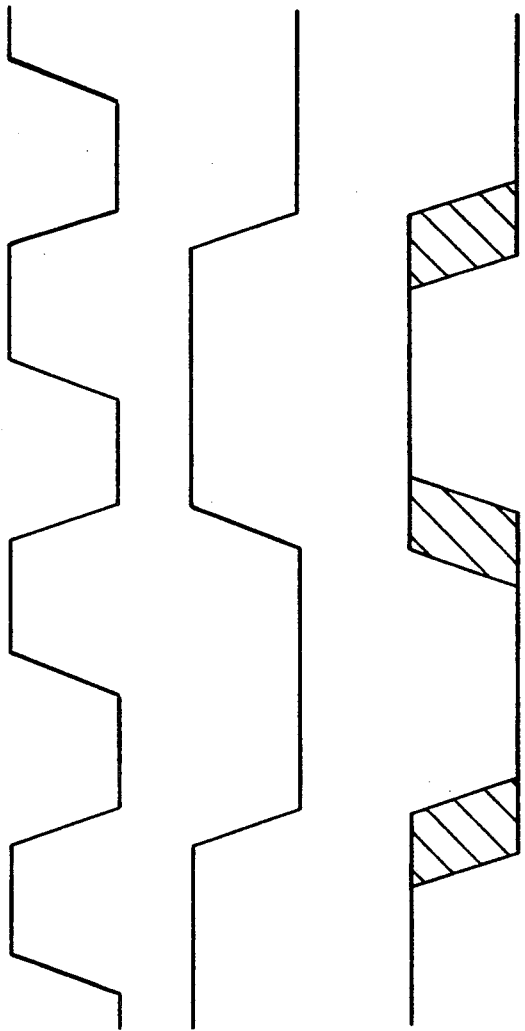
Fig.1
Fig.2a
Fig.2b
Fig.2c

PROCESS FOR THE INTERMEDIATE AMPLIFICATION OF DIGITAL SIGNALS AND INTERMEDIATE AMPLIFIERS FOR DIGITAL SIGNALS

BACKGROUND

1. Field of the Invention

The invention concerns a process for intermediate amplification of digital signals, with amplitude and pulse regeneration, wherein the pulse regeneration comprises the following process steps: derivation of a receiving pulse signal from a received signal, reading the bits of the signal received with the receiving pulse signal into a buffer memory and reading out the bits with a local transmission pulse signal. The invention further concerns an intermediate amplifier for digital signals, with an amplitude and a pulse regeneration circuit. The pulse regeneration circuit includes a receiving pulse signal derivation circuit, a buffer memory, a control circuit and a local transmission pulse signal generator. A T7200 Multi Port Repeater Unit Controller of the AT&T company as described in its data sheet is an intermediate amplifier. The T7200 intermediate amplifier is intended for CSMA/CD (Carrier Sense Multiple Access/Collision Detection) access process according to the IEEE Standard 802.3 and satisfies the requirements relative to this process and standard. The CSMA/CD process is used in particular in connnection with computer networks.

2. Description of the Related Technology

FIG. 1 shows the fundamental configuration of a CSMA/CD computer network schematically. Computers $T_1$ are connected with each other by transmission channels, so-called $K_1$ segments. An intermediate amplifier $R_1$ also referred to as a repeater, is located between each of the individual segments. The repeater regenerates the digital signals transmitted through the transmission channels $K_1$ relative to both their amplitude and their transmission pulse. The amplitude regeneration is necessary as the digital data signals are weakened during their transmission in the transmission channels.

It will become apparent in the following from FIG. 2, why pulse regeneration is required. FIG. 2a reproduces the transmitter pulse signal, while FIG. 2b shows the transmitter data signal at the inlet of a transmission channel $K_1$. At the inlet of a transmission signal $K_1$ and at the outlet of a repeater $R_1$, the transmitter data are in a fixed time relationship with the transmitter pulse signal. In the course of the transmission of a data signal through a transmission channel $K_1$, this correct, fixed time reference of the data signal to the transmission pulse signal is lost. The reasons for this are the limited transmission band width of the transmission channels $K_1$, interference signals, time variable decision thresholds of the inlet circuits of the repeaters $R_1$, etc.

By means of a so-called NRZ (nonreturn to zero) signal this process is shown in FIG. 2c, wherein the amplitude regeneration has already taken place. Also, the phase shift caused by the running time of the data signal in the transmission channel $K_1$ between the data at the inlet and the outlet of a transmission channel $K_1$, is neglected. Due to the loss of the correct time relationship between the transmitter pulse signal and the data signal, the shaded area shown in FIG. 2c with an undefined phase, is obtained. This phase trembling, also referred to as jitter, changes the spectral properties of the data signal and must be minimized in order to allow pulse derivation free to errors in the receiver and thus a correct, error-free interpretation of the data signal in the receiver circuit. The pulse regeneration in the repeater $R_1$ has the function to retransmit the data signal without jitter.

In the following, the properties and parameters of the CSMA/CD transmission process according to the IEEE standard 802.3 are described, which are valid for the repeaters $R_1$ and which the repeaters $R_1$ are to satisfy.

One of the properties of the CSMA/CD access process is that the transmitted data are divided into individual packets. the packets are made up of a preamble, segment and useful data.

The preamble includes a regular data pattern without information, which allows the receivers, i.e., the participants or computers $T_1$ and the repeaters, to synchronize them on a data packet received. The minimum length of the preamble is specified and according to the IEEE standard 802.3 is 56 bits.

The control information and useful data part contains control information and the useful data themselves. The minimum and maximum lengths of said control and useful data parts are also specified and amount in this process to 512 bits as the minimum length and 12 144 bits as the maximum length.

Furthermore, the minimum time spacing in which the data packets may be transmitted is also specified. This spacing, which is also designated as the packet spacing or inter frame gap (IFG), may be 96 us. The minimum time spacing makes it possible for the participants and the computers $T_1$ to prepare themselves following the completion of a data packet for the reception of the next one.

The maximum running time of a data packet between the two farthest removed participants or computers $T_1$ is also specified in the network. In the case of the network discussed here, this maximum running time amounts to 25.6 us. At a given propagation velocity of the signals in the transmission channels $K_1$ the maximum spatial extent of the network with a known running time lag and known number of repeaters is specified. In the case of the CSMA/CD access process according to the aforementioned standard, this maximum spatial extension amounts to 5 km.

A further parameter of said access process according to the standard cited is the bit rate which amounts to $1 \times 10^7$ bits/s and is allowed a maximum deviation of $\pm 0.01\%$. The so-called Manchester code is used for coding, which in addition to the useful data also contains supplemental pulse information, thereby making possible secure pulse derivation by the computers $T_1$ and the repeaters, independently of the data content.

From the aforementioned properties, i.e., the structure of the data packet, the minimum time spacing between data packets and the maximum running time of a data packet in the network, the following requirements are derived relative to the pulse regeneration of a repeater $R_1$ in a CSMA/CD network according to the IEEE Standard 802.3.

1. If the length of the preamble during the passage of a data packet through a repeater were shortened, it would indicate that when several successive repeaters are used the preamble would be successively shortened further, until finally the synchronization of a participants or another repeater on the data packet would no longer be possible. Therefore, there exists the requirement that the length of the preamble in the course of the passage of a data packet through a repeater not be shortened, while a possible extension of the preamble is permissible.

2. If the time spacing between two successive data packets were shortened below a certain minimum value by the use of repeaters, this would signify that the packet spacing in the cascading of several repeaters would be progressively reduced, which in turn would limit the number of repeaters to be inserted in succession. There are no standards at the present time specifying minimum spacing at the receiver. However, there are draft standards specifying a minimum spacing of about 5 us. In the use of repeaters in the networks it must therefore be required that the time spacing between two successive data packets through a repeater be not shortened, or shortened by a certain amount only.

3. A further requirement relative to a repeater is that the start-up lag, also referred to as a start-up-delay should be as small as possible, as explained in more detail hereinbelow. The start up delay is the time elapsing between the receipt of the first preamble bit of a data packet and the retransmission of the data packet amplitude and/or pulse regenerated. The start up delay increases the running time of a data packet within the network, thereby reducing its maximum spatial extent; or in other words, a given spatial extent of a network limits the number of cascadable repeaters.

FIG. 3 shows the fundatmental structure of a conventional circuit layout for pulse regeneration in a repeater.

The receiving data signal is applied to the inlet 31 of the pulse regeneration circuit; it arrives at a pulse derivation and decoding stage 32. The pulse derivation and decoding stage 32 derives a receiving pulse signal from the receiving data signal, which in case of a network is Manchester coded according to the IEEE Standard 802.3 and converts it into the NRZ format. The NRZ data signal arrives through a line 33 at the inlet of a buffer memory 34. The receiving pulse signal passes through a line 35 as a read-in pulse signal to the read-in pulse signal inlet of the buffer memory 34.

The pulse signal derivation from the receiving data signal is carried out in the pulse derivation and decoding stage 32 usually by means of, a phase control circuit, also referred to as a Phase Lock Loop (PLL), whereby a local oscillator is synchronized with the preamble of the receiving data signal. Following the completion of the synchronization process a so-called RX carrier signal is generated, which arrives through the line 36 at a control circuit 37.

Through a line 38 a readout release signal arrives at a coder 39, which provides for the buffer memory 34 a transmission pulse signal as the readout pulse signal through the line 40, so that correspondingly the NRZ coded data is read out through the line 41 from the buffer memory 34 and converted in the coder 39 into Manchester coded data, so that at the outlet 42 a transmission data signal is present. As the data of the transmission data signal are in a fixed time relationship with the readout and transmission pulse signal, the transmission data signal is free to phase jitters.

The control circuit 37 transmits over the line 43 a read-in release signal to the buffer memory 34. Over a line 44, the control circuit 37 receives a so-called DOR signal, which indicates when the buffer memory 34 is completely read out. A transmission pulse generator 45 produces the transmission pulse signal for both the control circuit 37 and the coder 39.

The buffer memory 34 is preferably realized in keeping with the FIFO (first in, first out) principle and allows an independent, synchronous in- and out reading of data. The read-in of the receiving data signals appearing in the line 33 into the buffer 34 takes place synchronously with the receiving pulse signal standing at the line 35. The data are read out from the buffer memory 34 synchronously with the readout pulse signal in the line 40, which is identical with the local transmission pulse signal. The transmission pulse signal is asynchronous relative to the receiving pulse signal.

The number of bits to be stored intermediately in the buffer memory 34 depends on the frequency difference between the transmission and receiving pulse signal and the maximum length of the data packet. This condition is numberically visualized by the specifications of IEEE Standard 802.3.

According to the CSMA/CD process in keeping with said standard, the bit rate amounts to $1 \times 10^7$ bits/s with a maximum deviation of $\pm 0.01\%$, i.e. $\pm 1 \times 10^3$ bits/s. Without the preamble, the maximum packet length is 12 144 bit/s.

With a minimum bit rate, the packet duration has a minimum length of L2+1.214279 ms.

The difference between L1 and L2 thus amounts to 242 ns. As at a bit rate of $1 \times 10^7$ bit/s the bit time is 100 ns, this time difference of 242 ns corresponds approximately to 2.5 bit times. This signifies that at least 3 bits must be stored intermediately. If read-in takes place at the minimum permissible bit rate and the readout at the maximum permissible bit rate, i.e. the readout is faster than the read-in, the buffer memory must contain prior to the readout at least 3 bits, in order to insure that upon each readout pulse at least one bit is present in the buffer memory.

If, on the other hand, the read in is at the maximum bit rate and readout at the minimum bit rate, three additional bits must be stored intermediately. The minimum buffer memory capacity, also referred to as the minimum depth of the buffer memory, must therefore amount to at least 6 bits.

The figures determined here represent theoretical minimum values, wherein it is assumed in particular that the bit rates are within the tolerance limits specified. In the case of commercially inserted repeaters usually more than 3 bits are stored intermediately in order to reduce the sensitivity to fluctuations of bit rates, thereby increasing operating security.

The number of intermediately stored bits essentially determines the static running time of a pulse generating circuit. The static running time is the time between reception and retransmission of the same bit by a repeater. The concept of the static running time should not be confused with the aforementioned start up delay, which is defined as the time between the reception of the first preamble bit of a data packet and the retransmission of the first preamble bit of the amplitude and pulse regenerated data packet.

If n bits are stored intermediately and the transmission and receiving pulses are in agreement, the static running time is equal to or larger than n bit times.

The control circuit 37 controls the buffer memory 34 and the coder 39 over the line 43 and 38, respectively.

If the aforementioned synchronizing process in the pulse derivation and decoding stage 32 is completed and the receiving data signal and the receiving pulse signal are available at the outlet of said stage 32, this fact is communicated over the line 36 by means of the $R_x$ carrier signal to the control circuit 37, which depending on it releases the read in into the buffer memeory over the line 43. If an adequate number of data are stored in the buffer so that in the case of maximally different read in and readout velocities always at least one bit is available for the readout process, the readout is released by the coder 39.

At the end of a data packet, which is indicated to the control circuit 37 by the $R_x$ data signal, the control circuit 37 blocks the reading in of additional bits into the buffer memory 34. If the buffer 34 is then completely read out, which is indicated to the control circuit 37 over the line 44 by the DOR signal, the control circuit 37 blocks the readout of the buffer 34 by the coder 39 over the line 38. The transmission of a data packet is thereby completed.

The functional group of the pulse derivation and decoding stage 32 and the coder 39 may be an Advanced Micro Devices Company (AMD) AM7992B and described in the corresponding data sheets of the company. The control unit for such a repeater is marketed by the AT&T Microelectronics Co. in the form of the electronic module T7200 Multi-Port Repeater Unit Controller and is described in the corresponding data sheet. With this module at least 7 bits are stored intermediately. An example for a buffer memory 34 is the electronic module 74HCT40105 of the Valvo Co., which again is described in a data sheet of the company.

The transmission pulse generator 45 and its oscillator must satisfy relative to its frequency accuracy the requirements of the standard selected.

With respect to FIG. 4, in the following the variations of the data packet during its passing through the conventional pulse signal regeneration circuit shown in FIG. 3 is explained.

FIG. 4a shows the spatial distribution of a data packet at a time t=to, wherein it is assumed hypothetically that said data packet has passed through the repeater unaffected. In FIG. 4b the data packet altered by the repeater is shown.

The data packet always includes control information and a useful data part 48a and 48b, and the preamble 49a and 49b. The startup delay 50 is the sum to the time loss generated by the synchronizing process in the pulse derivation and decoding stage 32, and the static running time 51. The time loss caused by the synchronizing process amounts for example in the case of the electronic module AM7992B to at least four bit times. The combination of this module AM7992B with a repeater of 7 bits corresponding to the aforementioned module T7200 of AT&T would result in a startup time delay of 50 of about 1.1 us. In a computer network according to IEEE 802.3, in which the maximum running time of a data packet between the two participants $T_1$ farthest removed in the network amounts of 25.6 us, in case of a successive insertion of 25.6/1.1=23 repeaters the permissible extent of the network would therefore be reduced to 0, wherein the additional running time delays caused by individual circuit components (part of the pulse derivation and decoding stage 32), buffer memory 34 and coder 39, are neglected.

As explained above, preamble bit losses 52 occur. Due to the synchronizing process in the pulse signal derivation, some bits of the preamble are consumed, for example, at least 4 bits in the case of the AM7992B module. With a preamble length of 56 bits the data bits would have no preamble after passing through 14 repeaters.

As the startup time delay 50 is larger than the static running time 51, the time spacing of two successive data packets increases with each repeater.

The discussion presented in the foregoing clearly indicates that with the circuit shown in FIG. 3 the aforedescribed requirement relative to a repeater that the length of the preamble must not be reduced and that the startup time delay should be as short as possible, cannot be satisfied. The use of the circuit layout shown in FIG. 3 is possible in a network according to IEEE 802.3 to a very limited extent only.

FIG. 5 displays schematically a known extended pulse regeneration circuit. The circuit components in FIG. 5, which correspond to those in FIG. 3, are provided with the same reference symbols and are not explained again.

The circuit layout according to FIG. 5 differs from that of FIG. 3 in that additionally a carrier recognition stage 55 and a stage 56 to produce a synthetic preamble, referred to hereafter as a preamble generator, are provided. The inlet of the carrier recognition stage 55 is connected by a line 60 to the inlet 31 of the pulse regeneration circuit, so that the carrier recognition stage 55 is able to detect the onset of a preamble of an incoming data packet. This information is conducted to the control circuit 37 over the data line 57 with the signal "data present". By a line 58 the control circuit 57 is connected to a preamble generator 56, the outlet signal arrives over the line 59 at the coder 39. The preamble generator 56 further receives the readout pulse signal on the line 40 which also constitutes the transmission pulse signal.

The carrier recognition stage 55 has a configuration such that the time delay between the onset of the preamble appearing at its inlet and the report to the control circuit 37 is very small, preferably shorter than one bit time. The control circuit 37 there is informed even prior to the completion of the synchronizing process in the pulse derivation and decoding stage 32 of the arrival of a data packet at the pulse regeneration circuit.

The structure of the preamble at the beginning of a data packet is unambiguously determined. It is therefore possible to transmit a synthetic preamble in place of the preamble received. The preamble generator 56 performs this task and produces a synthetic preamble.

When the control circuit 37 is informed by the carrier recognition stage 55 of the reception of data packet, it activates following a selective waiting period the preamble generator 56 over the line 58 and the coder 39 over the line 38. If the waiting period is chosen to be small or practically zero, the synthetic preamble has already been sent out prior to the completion of the synchronization for the pulse derivation and before the buffer memeory 34 has stored an adequate number of bits. This signifies that the startup time delay may be very small.

If since the onset of the appearance of an incoming data packet is sufficiently long period of time has passed to fill upon the memory 34, the preamble generator 56 is deactivated and the memory 34 released. Consequently, in place of the synthetic preamble from this point in time on the preamble received is transmitted.

The further progress to the end of the data packet now corresponds to the pulse generation circuit shown in FIG. 3 and therefore is not explained further.

FIG. 6, shows the schematic spatial configuration of data packets. The changes applied to a data packet during its passage through a pulse generation circuit according to FIG. 5 are explained below.

FIG. 6a shows the spatial distribution of the unaffected data packet at a time t=to with the hypothetical assumption that the data packet has passed through the repeater without alterations. In FIG. 6b, the data packet altered by the pulse regeneration circuit shown in FIG. 5 is reproduced. The parts of the data packet, preambles and durations, to the extent that they correspond to those in FIG. 4, are provided with the same symbols and are not discussed further.

From a comparison of the unaffected data packet and the one altered by the pulse generation circuit, the following may be derived:

As the carrier recognition stage 55 immediately detects the onset of an incoming data packet, a synthetic preamble part 61 may be transmitted, which is followed by the transmission of the preamble part 62 received, when the synchronizing process in the pulse generation and decoding stage 32 is completed.

It follows that compared to the data packet altered by the circuit in FIG. 3, according to the FIG. 4b the startup time delay, i.e., the period of time between the reception of the first preamble bit and the first re-transmission bit of a data packet is small. Another advantage of the pulse regeneration circuit according to FIG. 5 relative to that of FIG. 3 is that the preamble is not shortened. A further consequence is that the packet spacing or inter frame gap is reduced by the difference between the startup time delay and the static running time.

SUMMARY OF THE INVENTION

In view of the above described properties of the data packet altered in keeping with the pulse regeneration circuit of FIG. 5, the requirements posed relative to a repeater of minimum time spacing or an unchanged inter frame gap, and a minimum running time of a data packet—as described above—cannot be satisfied simultaneously. In case of a short startup time delay the inter frame gap is reduced strongly and slightly only with a large gap. In the cases of a pulse generation circuit to be used in actual practice, for this reason a compromise is reached between the two requirements. With the module T7200 the waiting period between the onset of the data reception and the transmission of the synthetic preamble i.e., the startup time delay, corresponds to the static running time, which is determined by the number of buffered bits. Here, the inter frame gap is altered slightly only. However, with an intermediate storage of 7 bits and an assumed signal velocity of 20 cm/ns the maximum network extent is reduced by a CSMA/CD network by about 140 m per repeater.

It is an object of the invention to provide a process for intermediate amplification of digital signals and to create a repeater, whereby it is possible to better satisfy the requirements of intermediate amplification of a digital data signal and relative to repeaters and in particular to minimize the startup time delay and the shortening of the packet spacing or the inter frame gap with a slight technical effort.

Based on the aforementioned process for intermediate amplification of digital signals the above defined object is attained by determining the phase difference between the receiving pulse signal and the local transmission pulse signal and modifying the phase difference.

The characteristics according to the invention make it possible to maintain the number of bits to be stored intermediately considerably lower than in the case of conventional processes and repeaters. As shown hereinbelow it is possible on the basis of the measures and characteristics of the invention to eliminate the restriction of the maximum packet length, which according to the CSMA/CD access process in keeping with IEEE 802.33 amounts to 144 bits, so that when using the intermediate storage process and the repeater of the invention it is possible in principle to reliably process packets of arbitrary length in a network.

Another important advantage of the present invention is that the frequency of the receiving pulse may be far outside of the tolerance band, for example, outside a tolerance band of $\pm 1$ kHz according to IEEE 802.3, without affecting the safe operation of the circuit layout. With the process and repeater of the invention the number of bits to be stored intermediately depends only on the configuration of the memory. In contrast to the conventional memories, in which at least 7 bits must be stored intermediately, the repeater according to the invention is capable of operating with a storage of a maximum of 2 bits.

According to a preferred embodiment of the invention, the phase of the local transmission is altered so that the receiving pulse signal and the transmission pulse signal are in essential agreement.

An alternative embodiment of the invention uses the receiving pulse signal as the transmission pulse signal, wherein the phase difference is essentially zero. This renders the frequency of the transmission pulse equal to the frequency of the receiving pulse.

Another advantageous configuration of the invention is that n local transmission pulse signals with a mutual phase difference of $360/n°$ are provided and that the local transmission pulse signal with the smallest phase difference relative to the receiving pulse signal is selected. By pulse switching at the end of a data packet a transmission pulse is available, from which line control signals may be derived that are synchronous with the receiving pulse of the preceding data packet. Such synchronous line control signals are included in drafts for an extension of the IEEE 802.3 standard, concerned with the use of optical transmission paths.

According to another embodiment of the invention, a line control signal to be transmitted after the digital data signals is derived from the transmission pulse signals selected from the n local transmission pulses.

An embodiment is advantageous, in which the transmission pulse signal is derived from the receiving pulse signal, if the phase difference declines below a given threshold value.

According to a highly advantaqeous configuration of the invention the phase of the local transmission pulse signal is voltage controlled as a function of the phase difference.

It is advantageous in this context to use an instantaneous value of the phase difference as the set value for the voltage controlled regulation of the phase of the local transmission pulse signal. The instantaneous phase difference between the receiving and the transmission signal is maintained constant by a phase control circuit, which leads to an exact equalization of frequencies of the receiving and transmission pulses.

From the voltage controlled transmission pulse signal preferably a line control signal to be transmitted after the digital signal is derived. The advantage here is that the frequency of the transmission pulse signal varies continuously and not abruptly within the admissible tolerance range.

Of particular advantage is an embodiment in which the receiving pulse signal is delayed by a period of time which is larger than or equal to a period of time corresponding to the number of bits intermediately stored. It is assured in this manner that the buffer memory at the end of a data packet is completely read out. Instead of an independent time delay, it is advantageous to carry out the delay in connection with the pulse derivation.

Relative to the present invention, it is advantageous to carry out the decoding of the data of the receiving signal and the coding of the data read out from the buffer memory.

The coding preferably is such that pulse derivation is possible.

In case of an existing preamble, the length losses caused by the pulse derivation are equalized.

According to a further development of the invention, a synthetic preamble is essentially transmitted immediately following the recognition of an incoming data packet and prior to the conclusion of the pulse derivation from the incoming data signal. It is assured in this manner that the preamble transmitted of a data packet is not shorter that the preamble received.

The receiving pulse signal is derived preferably by means of a phase control circuit.

The present invention may be used advantageously in particular in a CSMA/CD access process according to IEEE 802.3.

The object of the invention may also be attained by a repeater of the aforementioned type, wherein a phase comparator is provided to determine the phase difference between the receiving pulse signal and the local transmission pulse signal.

If the phase difference declines below a given threshold value or if the phase difference preferably is zero, the receiving timing signal is used as the transmitting timing signal.

If the phase difference declines below a given threshold value or if the phase difference preferably is zero, a timing signal switch transmits the receiving timing signal as the transmitting timing signal, the receiving timing signal is used as the transmitting timing signal. As the result, the frequency of the transmitting timing signal is equal to the frequence of the receiving timing signal. The maximum packet length may therefore be of arbitrary length, without thereby endangering the operation of the repeater. It is possible to carry out the intermediate amplification even if the frequency of the receiving timing signal is far outside the tolerance band. The number of the bits to be stored intermediately thus depends only on the configuration of the buffer memory so that is possible to store a maximum of only 2 bits. In this manner, both the startup time delay and the shortening of the inter frame gap may be minimized.

In advantageous embodiment of the invention the local transmission timing signal generator is a voltage controlled oscillator. A scanning and holding element is provided in connection with the voltage controlled oscillator to store an instantaneous value of the phase comparator output signal.

The voltage controlled oscillator preferably is a quartz stabilized oscillator. Advantageously, the buffer memory is a asynchronous first-in-first-out (FIFO) buffer memory.

BRIEF DESCRIPTION OF THE DRAWINGS

FIG. 1 shows a schematic view of a conventional CSMA/CD computer network.

FIGS. 2(a)-2(c) show signal variations in a schematic view to demonstrate phase jitter.

DETAILED DESCRIPTION OF THE PREFERRED EMBODIMENT

Figure 5:
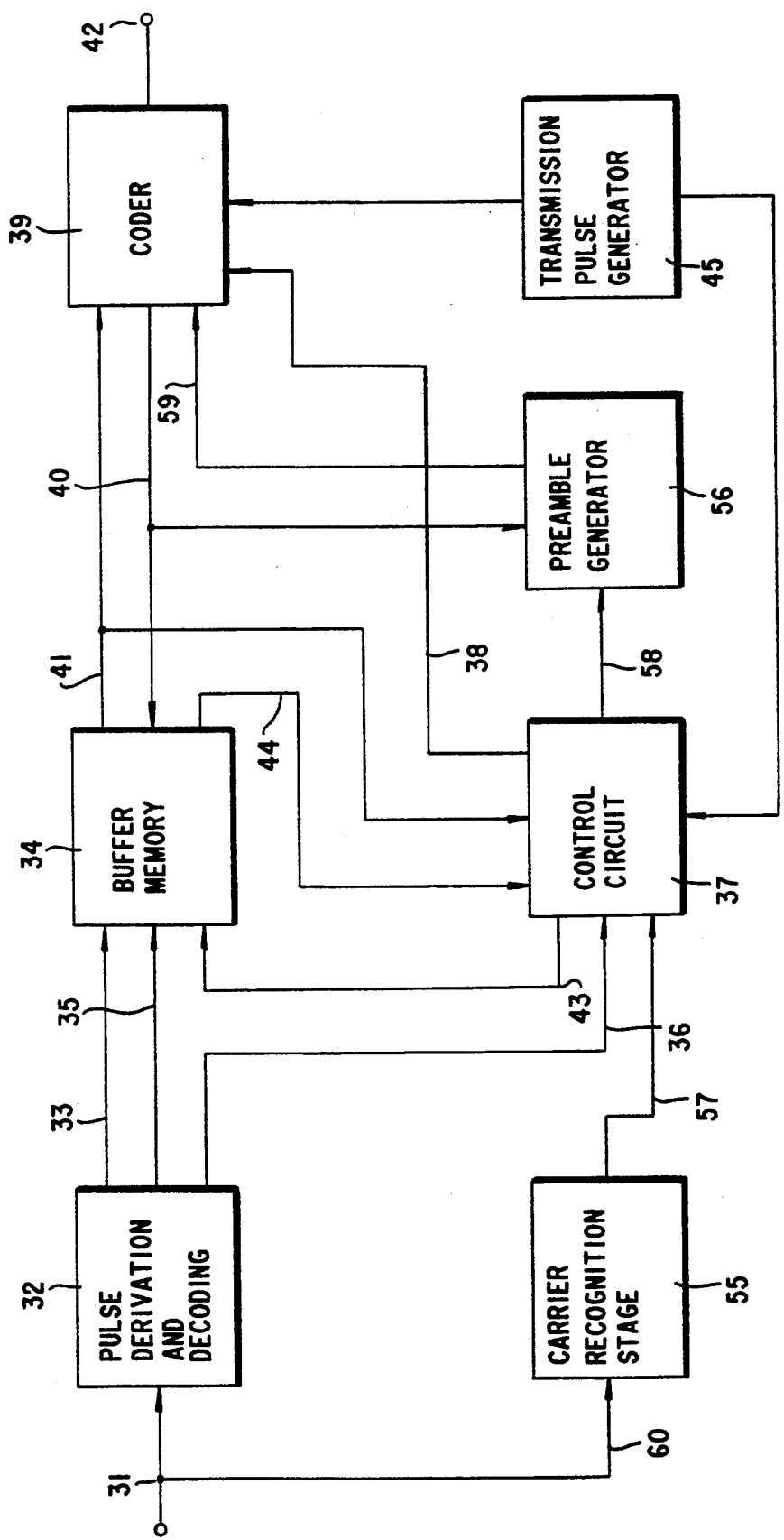
FIG. 5 shows a conventional pulse regeneration circuit broadened relative to the circuit layout shown in FIG. 3.
Figure 7:
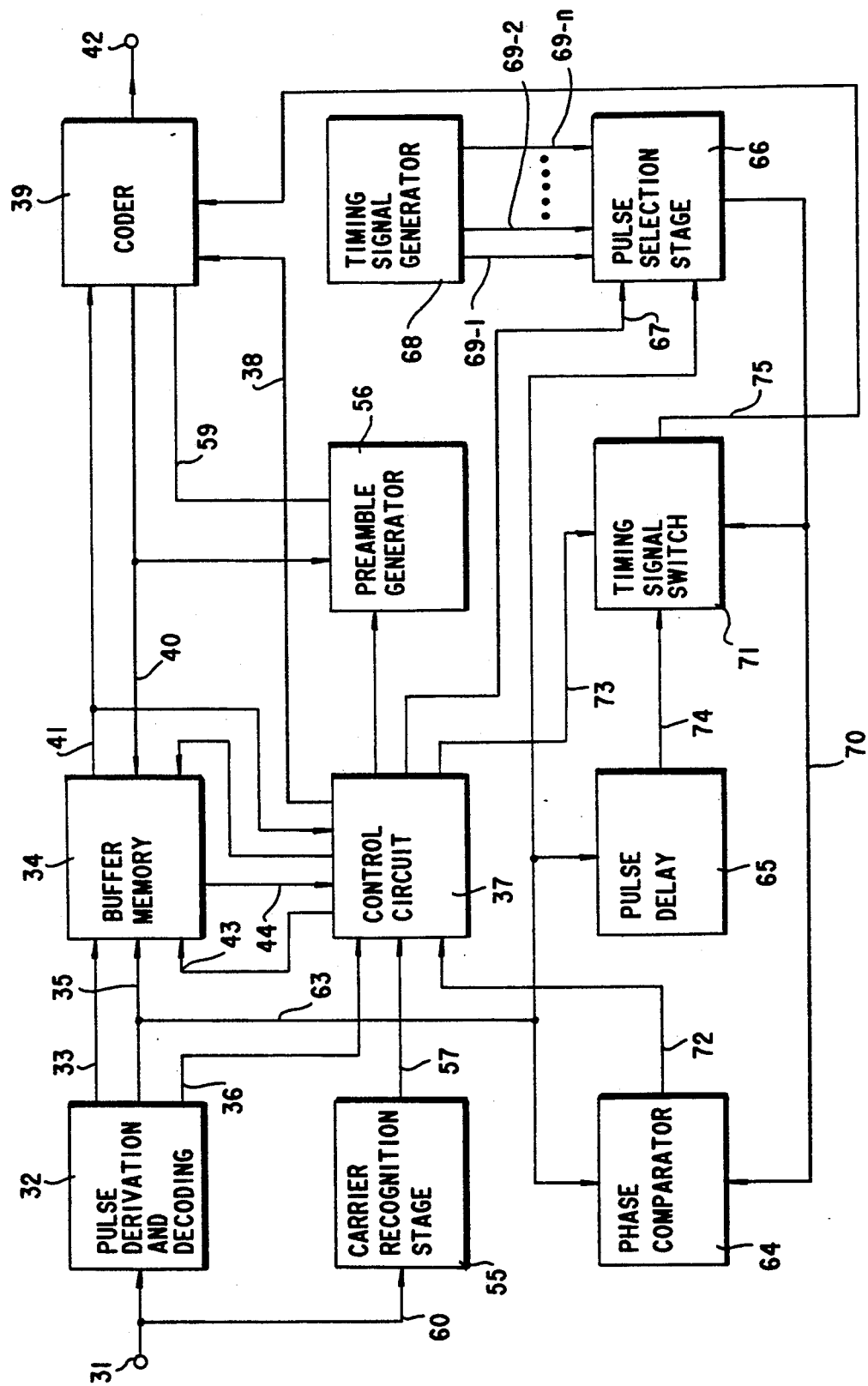
FIG. 7 shows embodiment of the repeater according to the invention.

FIG. 7 shows an embodiment of a pulse regeneration circuit for a repeater according to the invention. Parts of the circuit which correspond to those of FIG. 5 are provided with the same symbols and are not further described.

The receiving timing signal on the line 35 is conducted over a line 63 to a phase comparator 64, a pulse delay stage 65 and a pulse selection stage 66, for which control signals are further made available over a line 67. A timing signal generator 68 has n outlets 69-1, 69-2 . . . 69-n, at which timing signals are provided, which relative to each other have a phase difference of 360/n degrees. These n timing signals are made available to the pulse selection stage 66. The output signals of the pulse selection stage 66 arrive over a line 70 at a timing signal switch 71 and phase comparator 64. The phase comparator 64 prepares an output signal for the control circuit 37 over a line 72. An outlet of the control circuit 37 is connected further with an inlet of the time signal switch 71. The pulse delay stage 65 supplies to the timing signal switch 71 a delayed receiving timing signal switch 71 a delayed receiving timing signal oer the line 74. The output signal of the timing signal switch 71 arrives over a line 75 at the coder 39.

The phase comparator 64 determines the phase difference between the local timing signal provided by the timing signal selection stage 66 and the receiving timing signal determined by the pulse derivation and coding stage 32. If the phase difference declines below a given threshold value which may tend to zero, this is communicated to the control circuit 37 over the line 72.

Figure 3:
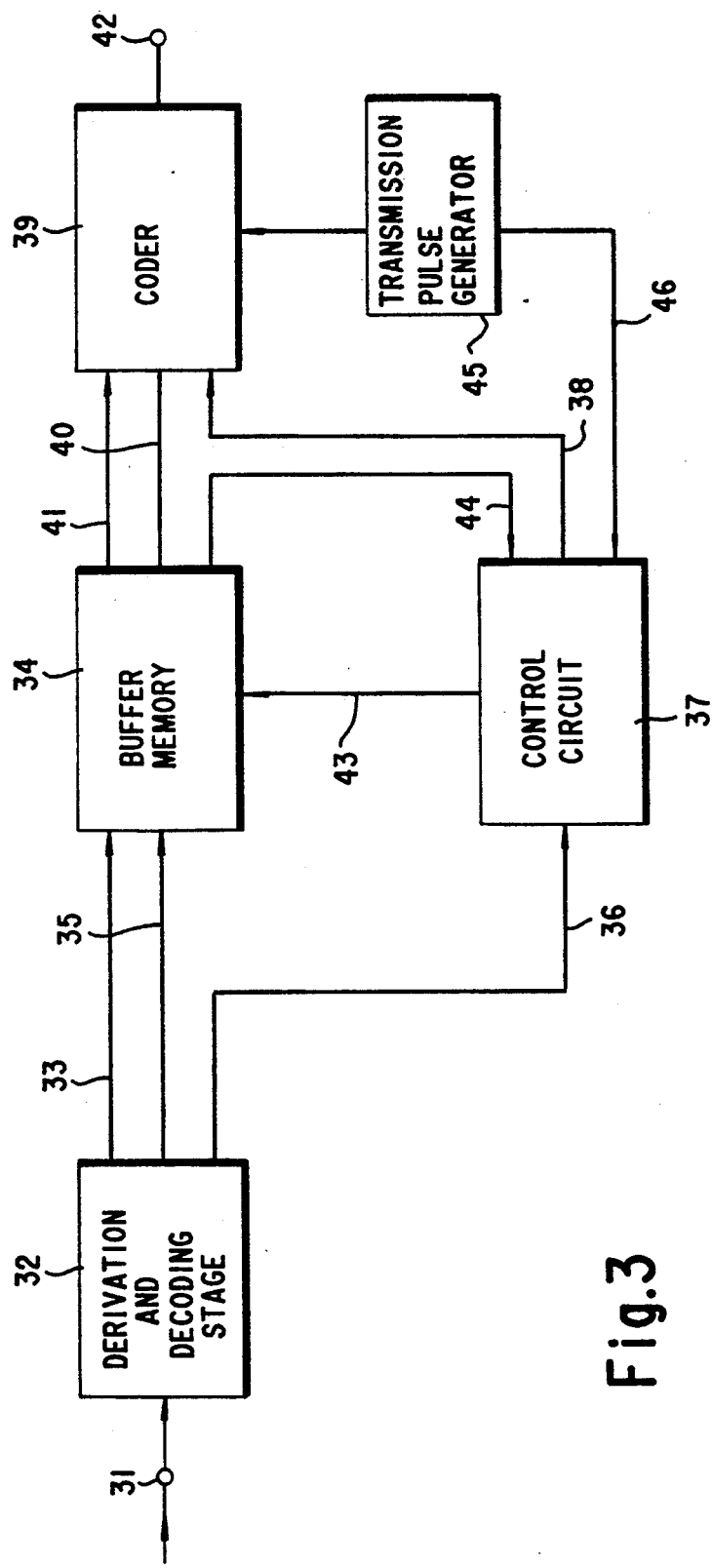
FIG. 3 shows the basic structure of a conventional circuit layout for timing signal generation in a repeater.
Figure 4A:
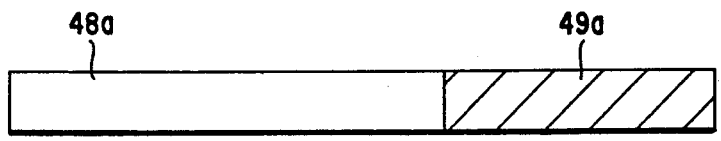
FIGS. 4(a) and 4(b) shows schematic spatial views of data packets to demonstrate alterations applied to the data packet by the repeater shown in FIG. 3.
Figure 4B:
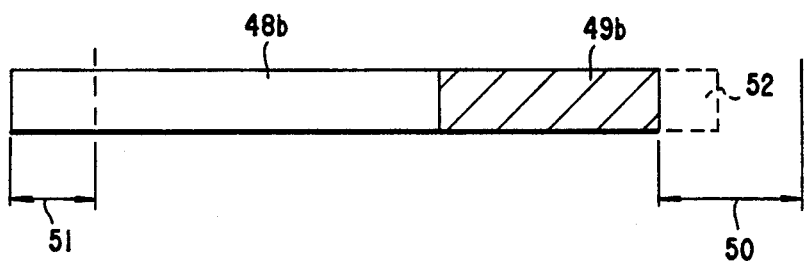
Figure 6A:
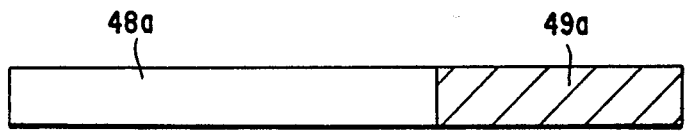
FIGS. 6(a) and 6(b) shows schematic perspective views of data packets to explain the changes applied to the data packet by the repeater shown in FIG. 5.
Figure 6B:
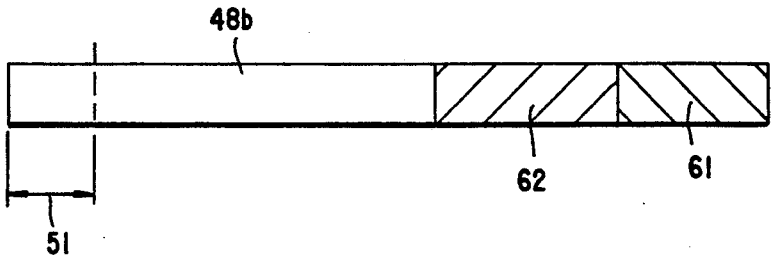

Following the end of a data packet the receiving timing signal—as demonstrated relative to FIG. 3—is immediately deactivated. If n bits are stored intermediately and if the transmission timing signal is derived directly from the receiving timing signal, the receiving timing signal must be delayed by at least n bit times, in order to be able to completely read out at the end of a data packet the memory 34. This is effected by the pulse delay stage 65. In principle, this task may also be performed directly by the pulse derivation and decoding stage 32, so that then the pulse delay stage 65 may be eliminated.

As a function of the output signal appearing on line 73 of the control circuit 37, the timing signal switch 71 prepares either the local timing signal or the delayed receiving timing signal, which arrives over the line 75 at the code 39.

The timing selection switch 66 passes as a function of the control signal provided by the control circuit 37 over the line 67 the signal of the n oscillator signals that offers the smallest phase difference relative to the receiving timing signal to its outlet.

At the onset of the reception of a data packet the mode of operation corresponds entirely to the pulse regeneration circuit shown in FIG. 5. At the beginning of the retransmission of the preamble received in the mode already explained the phase difference between the receiving timing signal at the inlet of the buffer memory 34 and the readout timing signal at the outlet of the buffer memory 34, which corresponds to the transmission timing signal, may be within 0 degree and 360 degree. Due to the frequency difference between the receiving timing signal and the local pulse signal the phase difference in the course of the data reception may decrease to 0 degree or increase to 360 degree, so that the state variation of the two timing signals is synchronous. This is recognized by the phase comparator 64 and communicated to the control circuit 37, which then causes the timing signal switch 71 to switch from the local pulse signal to the receiving timing signal. From this time on the frequencies of the receiving and the readout or transmission timing signals are identical. It is therefore no longer necessary to intermediately store bits to equalize frequency differences, as is required in the case of the conventional repeaters. The intermediate storage of a least 3 bits, as described above in connection with conventional circuits, may thus be eliminated. The buffer memory 34 therefore must equalize only the phase differences between the receiving and the readout or transmission timing signal, i.e., 1 bit.

At the end of the data packet the pulse selection stage 66 selects the one of the n output signals of the oscillator as the local timing signal that has the smallest phase difference relative to the receiving timing signal. Following the complete read-out of the buffer memory 54 the timing signal switch 71 passes the local timing signal through its outlet. The phase shift created by the switching in the transmission timing signal depends on the number of outlets of the oscillator and therefore may be kept in principle as low as desired. Due to the pulse switch, a transmission timing signal is available at the end of the data packet, from which line control signals may be derived; said signals being synchronous with the receiving timing signal of the preceding data packet. Such synchrounous line control signals are contained in drafts to expand the IEEE 802.3 standard, which are concerned with the use of optical transmission paths.

If no line control signals are transmitted, pulse selection may be omitted. In this case one oscillator output signal is sufficient.

The read-in or read out of data into or out of the data memory 34 takes place during the transmission timing signal. If the receiving timing signal and the transmission timing signal are in phase relative to each other, the bit read in a pulse period earlier, may be read out with the positive side of the transmission timing signal. This signifies that at least one bit must be stored intermediately. In the general case, a bit is read out after more than bit period. By the gradual increase in the phase shift to 360°, this delay time may grow to a maximum of two bit periods. This means that that at least one bit must be stored intermediately. In the general case, a bit is read out after more than bit period. By the gradual increase in the phase shift to 360°, this delay time may grow to a maximum of two bit periods. This means that aximum of two bits must be stored intermediately.

Figure 8:
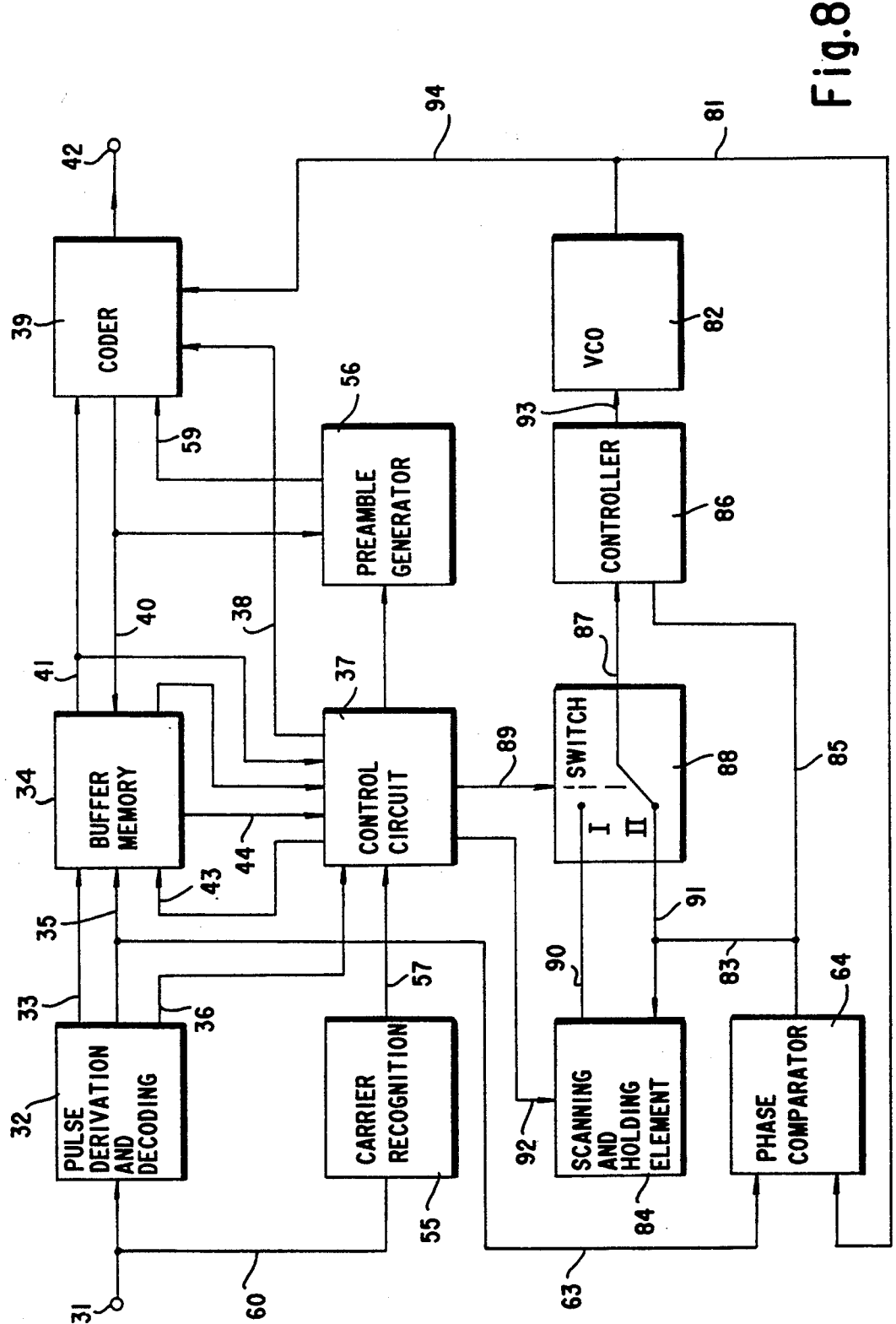
FIG. 8 shows another repeater embodiment.

FIG. 8 shows another advantageous embodiment of the invention. Parts of the circuit of FIG. 8 corresponding to those of circuits already discussed, are provided with the same reference symbols and are not explained again.

The phase detector 64 receives over the line 63 the receiving timing signal standing at the line 35 and over a line 81 the output signal of a voltage controlled oscillator 82 The output signal of the phase comparator 64 arrives over a line 83 at the inlet of a scanning and holding element 84 and over a line 85 to the actual value inlet of a controller 86. The set value inlet of the controller 86 is connected by a line 87 with the outlet of a switch 88, which may be switched from a switching position I into a switching position II and vice versa, by switching signal provided by the control circuit in the line 89. The connector for the switching position I is connected with the outlet of the scanning and holding element 84 by a line 90, and the connector for the switching position II with the inlet of the scanning and holding element 84 by a line 91, with the output signal of the phase comparator 64 also being applied to said inlet 84. Another inlet of the scanning and holding element 84 is connected by means of a line 92 with the control circuit 37.

The controller 86 emits an output signal over the line 93 to the voltage controlled oscillator 82, the output signal of which is provided not only for the phase comparator 84 over the line 81, but also the coder 39 over the line 94.

The phase comparator 64 provides the controller 86 and the inlet of the scanning and holding element 84 with a signal corresponding to the phase difference between the transmission and reciving timing signal. As a function of a control signal of the control circuit, the scanning and holding element stores an instantaneous value of the output signal of the phase comparator 64 and makes it available at its outlet, which is connected by the line 90 with the connector of the switching position I of the switch 88. The switch 88 passes through its outlet as a function of the switching signal provided by the control circuit 37 over the line 89 either the output signal of the phase comparator 64 or the value of the output signal of the phase comparator 64 instantaneously stored by the scanning and holding element 84, which then forms the set value of the controller 86. The controller 86 provides the voltage controlled oscillator 82 with an output signal that is proportional to the difference of its two input signals.

The voltage controlled oscillator delivers a signal the frequency whereof depends on the output signal of the controller. It is asssumed in the process that its median frequency is within the tolerance zone required, which according to IEEE 802.3 amounts to ±1 kHz. This tolerance requirement may be obtained with quartz stabilized, voltage controlled oscillators, the so-called VCXO. In this manner a phase control circuit is established, the output frequencey of which is either equal to the median frequency of the VCXO—switch position II—or to the frequency of the receiving timing signal—switch position I—, with the phase difference between the transmission and receiving timing signals being determined by the output signal of the scanning and holding element 84.

In the rest state, i.e. when no data packet is being received, the switch 88 is in position II; the control difference at the inlet of the controller 86 is zero. The VCXO therefore oscillates at its median frequency.

At the onset of the reception of a data packet the mode of operation corresponds to that of the pulse regeneration circuit according to FIG. 7. For a sufficiently long period of time following the end of the synchronizing process of the pulse derivation, the duration whereof depends on the dynamic properties of the phase comparator 64, the instantaneous value of the output signal of the phase comparator 64 is stored and the switch 88 switched to position I. The instantaneous phase difference between the transmission and receiving timing signals is then maintained constant by the phase control circuit. Consequently, this leads to an exact equalization of the transmission and receiving timing signals.

At the end of a data packet the switch is returned to position II, whereupon the frequency of the VCO again becomes the median frequency.

Corresponding to the discussion set forth relative to FIG. 7 of the emission of line control signals, in the embodiment shown in FIG. 8, line control signals may again be derived from the transmission timing signal following the end of a data packet. The line control signals are synchronous with the receiving timing signal of the preceding data packet. Compared to the example of FIG. 7, the circuit layout according to FIG. 8 has the additional advantage that the frequency of the transmission timing signal varies continously and not abruptly within the permissible tolerance range.

The present invention has been described by reference to examples. Those skilled in the art will find variations and modifications possible without exceeding the scope of the inventive concept. For example, the buffer memory 34 preferably is an asynchronous first in-first-out (FIFO) buffer memory. While the measures and characteristics of the invention may be applied in connection with all repeaters for digital transmission systems, the present invention is especially advantageous with the CSMA/CD access process according to the IEEE Standard 802.3.

We claim:

1. A process for intermediate amplification of digital signals transmitted as data packets, with amplitude and pulse regeneration, wherein pulse regeneration comprises the steps of:
    derivation of a receiving timing signal from a signal received;
    reading in bits of the signal received with the receiving timing signal into a buffer memory; and
    reading out the bits from buffer memory in accordance with a local transmission timing signal, altering the phase of said local transmission timing signal as a function of a phase difference between said receiving timing signal and said local transmission timing signal;
    recognizing an incoming data packet;
    transmitting a synthetic preamble essentially immediately following recognition of an incoming data packet and prior to completion of said step of derivation of a receiving timing signal.

2. A process according to claim 1, wherein said local transmission timing signal phase is altered so that said receiving timing signal and said local transmission timing signal are essentially in agreement.

3. A process according to claim 2, further comprising the step of using a voltage level to control said local transmission timing signal phase as a function of phase difference.

4. A process according to claim 2, wherein said step of reading out the bits from said buffer memory is switched to be in accordance with said receiving timing signal as soon as the phase difference between said receiving timing signal and said local timing signal has become essentially zero.

5. A process according to claim 4, further comprising the step of generating a plurality of n timing signals exhibiting a phase different of 360°/n relative to each other selecting one of said n timing signals with the smallest phase difference relative to said receiving timing signal as said local transmission timing signal.

6. A process according to claim 4, further comprising the step of deriving a line control signal, to be transmitted after the digital data signals, from said selected local transmission timing signal.

7. A process according to claim 4, further comprising the step of using a voltage level to control said local transmission timing signal phase as a function of phase difference.

8. A process according to claim 1, wherein said local transmission timing signal is derived from said receiving timing signal, if said phase difference is below a predetermined threshold value.

9. A process according to claim 1, further comprising the step of utilizing a voltage level to control said local transmission timing signal phase as a function of said phase difference.

10. A process according to claim 9, wherein an instantaneous value of the phase difference is used as a set value for the voltage level control of said local transmission timing signal phase.

11. A process according to claim 9, further comprising the step of deriving a line control signal from the voltage controlled local transmission timing signal.

12. A process according to claim 1, further comprising the step of delaying said receiving timing signal by a period of time, which is longer than or equal to a period of time corresponding to a number of bits intermediately stored in said buffer memory.

13. A process according to claim 12, wherein said delay is effected in connection with said step of derivation of said receiving timing signal.

14. A process according to claim 1 further comprising the steps of decoding data of said receiving signal and coding data read out from a buffer memory.

15. A process according to claim 13, wherein said step of coding is reversible.

16. A process according to claim 1, further comprising the step of equalizing losses of signal length due to the pulse derivation when a signal preamble is present.

17. A process according to claim 1 wherein said step of derivation of said receiving timing signal is effected by a phase control circuit.

18. A process according to claim 1 wherein said process is used in connection with a CSMA/CD access process according to IEEE standard 802.3.

19. A digital signal repeater comprising:
    an amplitude and pulse regeneration circuit for data packets, wherein said regeneration circuit includes a receiving timing signal deriver, a buffer memory connected to said receiving timing signal deriver, a control circuit connected to said buffer memory and said receiving timing signal deriver, a local transmission timing signal generator, a phase comparator connected to said receiving timing signal deriver and said local transmission timing signal generator, and a synthetic preamble generator responsive to said control circuit.

20. A repeated according to claim 19, further comprising a timing signal switch connected to said receiving timing signal deriver and said local transmission timing signal generator, wherein said timing signal switch is responsive to said phase comparator and configured to pass a receiving timing signal as a transmission timing signal, when a phase difference, between said receiving timing signal and a local transmission timing signal from said local transmission timing generator declines under a predetermined threshold value.

21. A repeater according to claim 19, wherein said local transmission timing signal generator exhibits a plurality of n timing signals each having a phase difference of 360°/n relative to each other.

22. A repeater according to claim 21, further comprising a transmission timing signal selection stage, responsive to said n timing signals and said receiving timing signal, configured to select one of said n signals with the smallest phase difference relative to said receiving timing signal.

23. A repeater according to claim 19, wherein said local transmission timing signal generator is a voltage controlled oscillator.

24. A repeater according to claim 23, further comprising a scanning and holding element connected to said phase comparator.

25. A repeater according to claim 23 wherein said voltage controlled oscillator is a quartz stabilized, voltage controlled oscillator.

26. A repeater according to claim 19 wherein said buffer memory is an asynchronous first-in-first-out buffer memory.

27. A repeater according to claim 24 wherein said scanning and holding element is configured to store an instantaneous value output signal of said phase comparator.

28. A repeater according to claim 19 wherein said phase comparator is configured to determine phase difference.

* * * * *